(12) United States Patent
Toyooka

(10) Patent No.: US 6,809,892 B2
(45) Date of Patent: Oct. 26, 2004

(54) HOLLOW SURFACE ILLUMINATOR (75) Inventor: Kazuhiko Toyooka, Yamagata (JP)

(73) Assignee: 3M Innovative Properties Company, Saint Paul, MN (US)

( * ) Notice: Subject to any disclaimer, the term of this patent is extended or adjusted under 35 U.S.C. 154(b) by 0 days.

(21) Appl. No.: 10/333,391

(22) PCT Filed: Jul. 20, 2001

(86) PCT No.: PCT/US01/23022
§ 371 (c)(1),
(2), (4) Date: Jun. 6, 2003

(87) PCT Pub. No.: WO02/08663
PCT Pub. Date: Jan. 31, 2002

(65) Prior Publication Data
US 2004/0012943 A1 Jan. 22, 2004

(30) Foreign Application Priority Data
Jul. 26, 2000 (JP) .................................... 2000-225276

(51) Int. Cl.$^7$ ................................................ G02B 5/04
(52) U.S. Cl. ..................................... 359/833; 359/528
(58) Field of Search .............................. 359/831, 833, 359/834, 528; 349/67; 362/31; 385/133

(56) References Cited

U.S. PATENT DOCUMENTS

| 4,542,449 A | 9/1985 | Whitehead |
| 4,787,708 A | 11/1988 | Whitehead |
| 4,805,984 A | 2/1989 | Cobb, Jr. |
| 4,834,495 A | 5/1989 | Whitehead |
| 4,850,665 A | 7/1989 | Whitehead |
| 4,906,070 A | 3/1990 | Cobb, Jr. |
| 4,912,605 A | 3/1990 | Whitehead |
| 5,043,850 A | 8/1991 | Dreyer, Jr. |
| 5,056,892 A | 10/1991 | Cobb, Jr. |
| 5,243,506 A | 9/1993 | Whitehead |
| 5,258,896 A | 11/1993 | Dreyer, Jr. |
| 5,309,544 A | 5/1994 | Saxe |
| 5,339,382 A | 8/1994 | Whitehead |
| 5,497,294 A | 3/1996 | Dreyer, Jr. |
| 5,661,839 A | 8/1997 | Whitehead |
| 5,700,077 A | 12/1997 | Dreyer, Jr. |
| 5,712,694 A * | 1/1998 | Taira et al. .................... 349/9 |
| 5,745,632 A | 4/1998 | Dreyer |
| 5,863,114 A | 1/1999 | Nagatani |
| 6,104,854 A * | 8/2000 | Masaki et al. .............. 385/133 |
| 6,164,782 A * | 12/2000 | Pojar .......................... 359/528 |
| 6,418,253 B2 | 7/2002 | Whitehead |
| 6,522,807 B2 | 2/2003 | Whitehead |

FOREIGN PATENT DOCUMENTS

| EP | 0 292 173 | 11/1988 |
| JP | 06180552 | 6/1994 |
| JP | 11142845 | 5/1999 |
| WO | WO97/14914 | 4/1997 |

* cited by examiner

Primary Examiner—Euncha P. Cherry
(74) Attorney, Agent, or Firm—Stephen W. Buckingham (57) ABSTRACT

A light-conducting unit which can effectively balance the light-leaking effect and the light-propagation effect of the prismatic films forming the light-conducting space, and satisfy the requirements to reduce the weight of the unit is disclosed. A light-conducting unit comprising the first prismatic film and the second prismatic film, each having two major surfaces, one of which is a prismatic surface, and the other of which is a flat surface, said prismatic surface carrying prisms arranged substantially parallel to each other, wherein said two prismatic films are arranged so that the first edges of said prismatic films are positioned to form an opening, a light-conducting space is formed between said prismatic films, and the height of said light-conducting space does not substantially increase from said opening to the remote edges of the prismatic films opposing said opening, and the major surface of said first prismatic film which faces outside said light-conducting space is a light-emitting surface, and the arrangement of the both prismatic films and the directions of the prisms of the both prismatic films in relation to the incident direction of light are defined under the specific conditions.

6 Claims, 1 Drawing Sheet

HOLLOW SURFACE ILLUMINATOR

FIELD OF THE INVENTION

The present invention relates to a light-conducting unit, which is used as a surface light source of a back-light for a liquid crystal display or an outdoor signboard, or as an interior or exterior lighting device. The light-conducting unit of the present invention can be used as a substitute for a conventional light-conducting plate, and can reduce the weight of a light-conducting unit and in turn a surface light source, since it has a hollow light-conducting space therein.

BACKGROUND OF THE INVENTION

Figure 1:
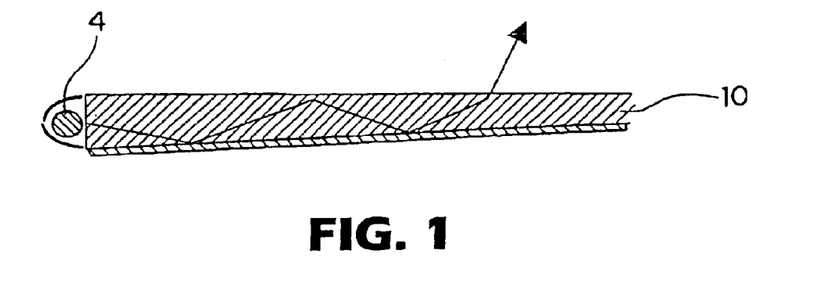
FIG. 1 is a cross section of a conventional surface light source.

As shown in FIG. 1, a conventional surface light source uses a solid light-conducting plate 10 to emit light, which is received from a spot light source or a linear light source, that is, a lamp 4 in FIG. 1. The light-conducting plate is usually made of a polymer material such as an acrylic resin. The light from the light source enters in the light-conducting plate through the light-incident edge (light-incident side face), and is allowed to emit from one of the major surfaces of the light-conducting plate while the light propagates through the plate from the light-incident edge towards the remote edge of the plate opposing the light-incident edge. Thus, the surface light emission is achieved.

The propagation of the light through the light-conducting plate utilizes total internal reflection of light at the interface between air and the light-conducting plate due to the difference of the refractive index between the air and the light-conducting plate (polymer material). Such a light-conducting plate is an essential part of a back-lighting surface light source for a liquid crystal display. Such a light-conducting plate and a back-light comprising the same are disclosed, for example, in Japanese Laid Open Patent Application A-11-142845.

However, when a solid light-conducting plate is used, it is difficult to reduce the weight of the surface light source. For example, the area of the light-conducting plate (light-emitting area) and also the thickness of the surface light source are being increased with the enlargement of the liquid crystal display screen. Thus, the weight increase of the light-conducting plate makes it very difficult to reduce the weight of the surface light source and, in turn, the weight of the liquid crystal display. Even in the case of small-sized liquid crystal displays, it is highly desired to reduce the weight of the surface light sources in the case of portable terminals such as mobile PCs, cellular phones, PHS, etc.

Accordingly, it has been proposed to use a hollow light-conducting unit instead of the solid light-conducting plate. For example, a hollow light-conducting unit is known, which comprises a light-emitting plate and a back plate which are arranged in parallel with each other to form a hollow light-conducting space, and two prismatic films which are placed on the respective surfaces of the light-emitting plate and the back plate facing inside of the light-conducting space.

The prismatic film is a well known optical element and means a light-transmitting film one major surface of which is flat, while the other major surface of which carries a plurality of prisms arranged in parallel with each other in the lengthwise direction (so-called parallel prisms). Such a light-transmitting film is usually placed between the light-conducting plate and an object to be illuminated (e.g. a liquid crystal display panel, etc.).

To allow the light to emit from the light-conducting unit, in general, a linear light source (e.g. a fluorescent tube, etc.) is placed along the opening which is formed at one end of the above light-conducting space, and the light is irradiated in the light-conducting space through the opening. Such an opening is formed by arranging the above pair of the prismatic films substantially in parallel with each other with leaving a gap between them. The pair of the prismatic films are usually arranged with allowing their flat surfaces to be in parallel with each other.

Such a light-conducting unit has a first opening formed at one end of the unit, and a second opening formed at the other end of the unit opposing the one end (the farthest end from the one end), and two light sources are placed at the respective openings to irradiate light into the light-conducting space. Since the pair of the prismatic films are arranged in parallel with each other, the height of the light-conducting space (in the thickness direction), that is, the size perpendicular to the light-emitting surface, does not substantially change from the first opening at the one end to the second opening at the farthest end from the one end.

One embodiment of such a hollow light-conducting unit, and a surface light source comprising the light-conducting unit and a light source is proposed by the present inventor in JP-A-6-180552. Prior to the invention of JP-A-6-180552, another embodiment of the light-conducting unit was known.

In the other embodiment of the light-conducting unit, (i) the arranging direction of the prisms of the prismatic film on the light-emitting plate is in parallel to the direction of light from the light source, and the prismatic surface carrying the parallel prisms is arranged to face the outside of the light-conducting space. Furthermore, (ii) the direction of the prisms of the prismatic film on the back plate is also in parallel with the direction of light from the light source, and the prismatic surface is arranged to face the outside of the light-conducting space. In the case of the surface light source comprising such a light-conducting unit, the illumination of light emitted from the light-emitting surface tends to decrease as the distance from the light source increases. Thus, an additional optical element is necessary to rectify such the decrease of the illumination. Such an additional optical is a so-called extractor, which has sawtooth-form reflective projections the distances of which increase as the distance from the light source increases. Such an extractor is usually arranged on the flat surface of the prismatic film on the back plate side.

The present inventor proposed, in JP-A-6-180552, an improved light-conducting unit to provide an inexpensive light-conducting unit and a surface light source which does not require any extractor and thus can be very easily designed and produced, and a surface light source.

That is, the proposed hollow light-conducting unit comprises a pair of prismatic films which are fixed in respective positions so that they are arranged in the specific three-dimensional configuration, wherein (I) the prismatic surface of one prismatic film, which functions as a light-emitting plane, is arranged, so that the direction of the prisms of this prismatic film is perpendicular to the direction of light from the light source, and the prismatic surface faces the inside of the light-conducting space. Furthermore, (II) the other prismatic film is arranged so that the direction of the prisms of the other prismatic film is in parallel with the direction of light from the light source, and the prismatic surface faces the inside of the light-conducting space. Thereby, the illumination on the light-emitting surface is made uniform without the use of an extractor.

With this above light-conducting unit, a part of the light emitted from the light source is reflected by the prismatic film, while the remaining part of the light passes through the prismatic film on the light-emitting side and is emitted from the light-emitting surface (leakage of light). The light, which is reflected by the prismatic film, is emitted from the light-emitting surface or propagated from one end near the light source to the farthest end from the light source by being repeatedly ed and transmitted by the prismatic films in the light-conducting space. That is, the balance between the leakage of light and the propagation of light is important. If the light-leaking effect is too high, the amount of light to be propagated decreases so that the uniformity of light emission tends to deteriorate. The increase of the light-leaking effect leads to the increase of the illumination brightness.

Accordingly, the optimization of the construction of the light-conducting unit, for example, the optimization of the three-dimensional configuration of the two prismatic films and the combination of the shapes of the prisms, or the selection and use of optical elements such as extractors, is necessary to balance the leakage of light and the propagation of light and to attain the desired brightness and also the uniformity of emitted light, in accordance with the application, size and the like of the light-conducting unit, that is, the surface light source.

SUMMARY OF THE INVENTION

As described above, the hollow light-conducting comprising a pair of the prismatic films which are arranged in parallel with each other and fixed in the specific configuration can reduce the weight of the unit itself, the surface light source and an apparatus comprising the surface light source (e.g. a liquid crystal display, etc.).

However, it is difficult to produce the above-described conventional light-conducting unit having a relatively small thickness. It is highly desired to further reduce the thickness of the liquid crystal device with the enlargement of the liquid crystal display screen. Furthermore, it is desired to further decrease the thickness of the above-described portable terminals.

To satisfy such requirements, it is necessary to decrease the thickness of the light-conducting unit, that is, the thickness (height) of the light-conducting space, to 30 mm or less, and preferably, 20 mm or less.

The reduction of the thickness of the light-conducting unit means the decrease of the height of the light-conducting space, that is, the size of the space which is in perpendicular to the propagation direction of the light. On the other hand, the area of the light-emitting surface, that is, the propagation distance of light, does not decrease significantly in connection with the decrease of the thickness of the unit. After the above-described proposal of the present inventor in JP-A-6-180552, further investigations have been made. As a result, it has been found that a large amount of light may leak near the edge at which the light source is placed, or almost all the amount of light may be propagated to the farthest end without leakage, when the height of the light-conducting space is relatively low. Therefore, it is necessary to more effectively balance the light-leaking effect and the light-propagation effect than ever, in order to easily realize the reduction of the thickness of the unit However, the use of additional optical elements such as an extractor may make the structure of unit complicated, and make it difficult to reduce the weight of the unit.

The present invention provides a light-weight light-conducting unit which can effectively balance the light-leaking effect and the light-propagation effect of the prismatic films forming the light-conducting space, and satisfy the requirements to reduce the weight of the unit.

According to the first aspect of the present invention, there is provided a light-conducting unit comprising the first prismatic film and the second prismatic film, each having two major surfaces, one of which is a prismatic surface, and the other of which is a flat surface carrying no prism, said prismatic surface carrying a plurality of prisms which are arranged substantially in parallel with each other along the lengthwise direction of the prisms, wherein said two prismatic films are arranged so that the first edges of said prismatic films are positioned substantially in parallel with each other leaving a gap between them to form an opening, a light-conducting space, which is in continuous from said opening, between said prismatic films, and the height (the size in the thickness direction) of said light-conducting space does not substantially increase from said opening to the remote edges opposing said opening, and the major surface of said first prismatic film, which faces outside said light-conducting space, is a light-emitting surface to emit light which is propagated from said opening into said light-conducting space, characterized in that said prismatic surface of said first prismatic film is placed facing outside of said light-conducting space, and the direction of said prisms of said first prismatic film is not parallel with the direction of said light.

According to the second aspect of the present invention, there is provided a light-conducting unit comprising the first prismatic film and the second prismatic film, each having two major surfaces, one of which is a prismatic surface, and the other of which is a flat surface carrying no prism, said prismatic surface carrying a plurality of prisms which are arranged substantially in parallel with each other along the lengthwise direction of the prisms, wherein said two prismatic films are arranged so that the first edges of said prismatic films are positioned substantially in parallel with each other with a gap between them to form an opening, a light-conducting space, which is in continuous from said opening, between said prismatic films, and the height (the size in the thickness direction) of said light-conducting space does not substantially increase from said opening to the remote edges opposing said opening, and the major surface of said first prismatic film, which faces outside said light-conducting space, is a light-emitting surface to emit light which is propagated from said opening into said light-conducting space, characterized in that said prismatic surface of said first prismatic film is placed facing outside of said light-conducting space and the direction of said prisms of said first prismatic film is parallel with the incident direction of said light, and that the arranging direction of said prism of said second prismatic film is not parallel to the direction of said light.

According to the third aspect of the present invention, there is provided a light-conducting unit comprising a first prismatic film and a second prismatic film, each having two major surfaces, one of which is a prismatic surface, and the other of which is a flat surface carrying no prism, said prismatic surface carrying a plurality of prisms which are arranged substantially parallel with each other along the lengthwise direction of the prisms, wherein said two prismatic films are arranged so that the first edges of said prismatic films are arranged substantially parallel with each other leaving a gap between them to form an opening and a light-conducting space, which is in continuous from said opening, formed between said prismatic films, and the major surface of said first prismatic film, which faces outside said light-conducting space, is a light-emitting surface to emit light which is propagated from said opening into said light-conducting space, characterized in that said prismatic surface of said first prismatic film is placed facing outside of said light-conducting space, the direction of said prisms of said first prismatic film is parallel with the direction of said light, said prismatic surface of said second prismatic film is placed facing outside of said light-conducting space, and also the direction of said prism of said second prismatic film is parallel with the direction of said light, and that said two prismatic films are arranged so that the height (the size in the thickness direction) of said light-conducting space decreases from said opening to the remote edges opposing said opening.

According to the fourth aspect of the present invention, there is provided a light-conducting unit comprising a first prismatic film and a second prismatic film, each having two major surfaces, one of which is a prismatic surface, and the other of which is a flat surface carrying no prism, said prismatic surface carrying a plurality of prisms which are arranged substantially in parallel with each other along the lengthwise direction of the prisms, wherein said two prismatic films are arranged so that the first edges of said prismatic films are positioned substantially parallel with each other leaving a gap between them to form an opening, a light-conducting space, which is continuous from said opening, between said prismatic films, and the height (the size in the thickness direction) of said light-conducting space does not substantially increase from said opening to the remote edges opposing said opening, and the major surface of said first prismatic film, which faces outside said light-conducting space, is a light-emitting surface to emit light which is propagated from said opening into said light-conducting space, characterized in that said prismatic surface of said first prismatic film is placed facing inside of said light-conducting space, while said prismatic surface of said second prismatic film is placed with facing outside of said light-conducting space.

According to the fifth aspect of the present invention, there is provided a light-conducting unit comprising a first prismatic film and a second prismatic film, each having two major surfaces, one of which is a prismatic surface, and the other of which is a flat surface carrying no prism, said prismatic surface carrying a plurality of prisms which are arranged substantially parallel with each other along the lengthwise direction of the prisms, wherein said two prismatic films are arranged so that the first edges of said prismatic films are positioned substantially parallel with each other leaving a gap between them to form an opening, a light-conducting space, which is continuous from said opening, between said prismatic films, and the height (the size in the thickness direction) of said light-conducting space does not substantially increase from said opening to the remote edges opposing said opening, and the major surface of said first prismatic film, which faces outside said light-conducting space, is a light-emitting surface to emit light which is propagated from said opening into said light-conducting space, characterized in that said prismatic surface of said first prismatic film is placed with facing inside of said light-conducting space, and also said prismatic surface of said second prismatic film is placed facing inside of said light-conducting space, and that the direction of said prisms of said first prismatic film is not perpendicular to the incident direction of said light.

According to the sixth aspect of the present invention, there is provided a light-conducting unit comprising a first prismatic film and a second prismatic film, each having two major surfaces, one of which is a prismatic surface, and the other of which is a flat surface carrying no prism, said prismatic surface carrying a plurality of prisms which are arranged substantially parallel with each other along the lengthwise direction of the prisms, wherein said two prismatic films are arranged so that the first edges of said prismatic films are positioned substantially parallel with each other leaving a gap between them to form an opening, a light-conducting space, which is continuous from said opening, between said prismatic films, and the height (the size in the thickness direction) of said light-conducting space does not substantially increase from said opening to the remote edges opposing said opening, and the major surface of said first prismatic film, which faces outside said light-conducting space, is a light-emitting surface to emit light which is propagated from said opening into said light-conducting space, characterized in that said prismatic surface of said first prismatic film is placed facing inside of said light-conducting space, and said prismatic surface of said second prismatic film is placed with facing inside of said light-conducting space, and the direction of said prisms of said first prismatic film is perpendicular to said direction of said light, and that the apex angle of said prism of said first prismatic film is smaller than that of said prism of said second prismatic film.

DETAILED DESCRIPTION

The prismatic film functions to totally internally reflect light, or to allow light to refract and pass therethrough depending on the apex angles of the prisms, the surface at which light enters, the incident angle of light, etc. Such optical functions of the prismatic film is explained by making reference to FIG. 2.

The shown prismatic film has, on its prismatic surface, a plurality of parallel prisms having the same shape and the same size, which are arranged in the lengthwise direction of the prisms. The example of FIG. 2 qualitatively illustrates the optical function of a prismatic film comprising prisms, which have an apex angle of 90 degrees, and a base angle of 45 degrees.

Figure 2A:
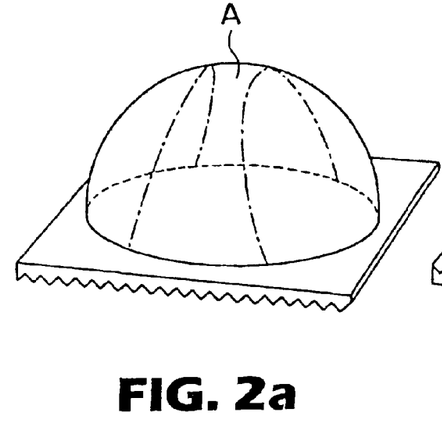
FIG. 2 illustrates the optical functions which depend on the structures of the prismatic films.
Figure 2B:
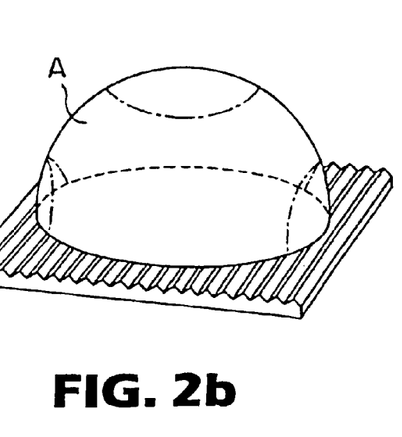

When light is irradiated on the prismatic film at the center of the hemisphere of FIG. 2(a) or 2(b), the light which reaches the film through the zone indicated with "A" is totally reflected, while the light which reaches the film through other zones propagates in the film and is refracted. The refracted light may return to the inside of the hemisphere or pass through the film and then it is emitted (leak out) from the surface opposite to the incident surface depending on the refractive angle or the number of refractions. That is, depending on the incident angle of light, the light is totally internally reflected and propagated to the farthest end, or is refracted and allowed to pass through the film and then emitted selectively. The shape and size of the zone A vary with the nature of the incident surface which faces the inside of the light-conducting space, that is, whether the incident surface being the prismatic surface or the flat surface, or the shape and size of the prisms. Accordingly, the effective combination of a pair of the prismatic films having such optical functions can adjust the balance between the light-leaking effect and the light-propagation effect.

According to the present invention, the thickness of the unit can be easily reduced by the suitable selection of the three-dimensional configuration of the prismatic films and the combination of the shapes of the prisms and balancing the light-leaking effect and the light-propagation effect. The three-dimensional configuration of the prismatic films and the combination of the shapes of the prisms, which should be optimally designed, are summarized as follows:

(a) The combination of the directions of the prismatic surfaces of the two prismatic films, that is, facing the inside or the outside of the light-conducting space;

(b) The direction of the prisms of the two prismatic films, that is, the angles of the direction of the prisms with the incident direction of the light from the light source; this angle being 0 degree when the direction of the prisms is in parallel with the direction of the light from the light source, while it being 90 degrees when the direction of the prisms is perpendicular to direction of the light from the light source;

(c) The combination of the apex angles of the prisms of the two prismatic films; that is, the prismatic films may have the same apex angle, or they may have different apex angles.

(d) The combination of the planes of the two prismatic films; that is, their flat surfaces are parallel with each other, or not in parallel with each other. In the case of non-parallel, the two prismatic films are arranged so that the height of the light-conducting space decreases from the opening formed at one end toward the farthest end from the opening. In this case, the cross sectional shape of the light-conducting space in the plane along the incident direction of the light is in the form of a wedge.

Figure 3:
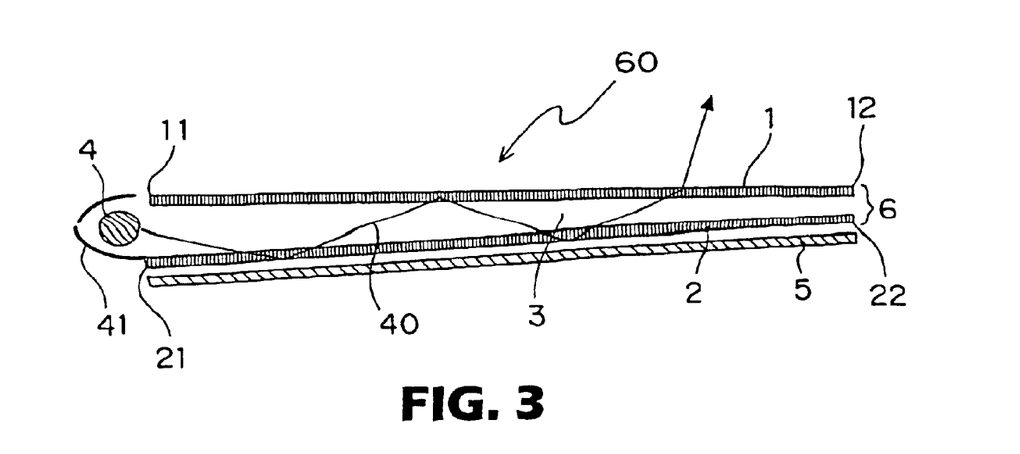
FIG. 3 is a cross section of a surface light source comprising one preferred example of the light-conducting unit according to the present invention.

Now, one preferred embodiment of the light-conducting unit according to the present invention, which is assembled by effectively combining the three-dimensional configuration of the prismatic films and the shapes of the prisms, is explained by making reference to FIG. 3.

FIG. 3 is a vertical cross section of the surface light source (60) comprising the light-conducting unit (6) of the present invention, and the light source (4). This figure is a cross section of the surface light source in the plane perpendicular to the light-emitting surface along the incident direction of the light (40) from the light source (4) into the light-conducting space (3).

In the embodiment of FIG. 3, the two prismatic films (1, 2) are arranged to form the light-conducting unit (6) comprising the prismatic films (1, 2) leaving a distance to provide the hollow light-conducting space (3) between them. Furthermore, the one edges (11, 21) of the prismatic films (1, 2) are positioned in parallel with each other with leaving a gap between them to form the opening (30), and the opening (30) and the light-conducting space (3) are continued.

The light source (4) is provided near the opening (30) so that it can effectively illuminate the inside of the light-conducting space (3), and form the surface light source (60) together with the light-conducting unit (6). In the embodiment of FIG. 3, the reflection plate (41) is placed so that it partially covers the illumination surface of the light source (4). The reflection plate (41) is effective to prevent the light from illuminating other directions than the light-conducting space (3). In general, the reflection film (5) is provided on the back surface of the second prismatic film (2), that is, the outside surface opposite to the surface facing the inside of the light-conducting space, to increase the luminance of the light-emitting surface of the first prismatic film (1), that is, the upper surface in FIG. 3.

When the thin light-conducting unit as in the embodiment of FIG. 3 is assembled, the cross section of the light-conducting space (3) preferably has a wedge shape. That is, the flat surfaces of the prismatic films (1, 2) are not parallel to each other, and the two prismatic films are arranged so that the height of the light-conducting space (3) decreases from the opening (30) at the first edges (11, 21), where the light source (4) is provided, towards the farthest edges (12, 22).

In the first embodiment of the present invention, of the two prismatic films, the first prismatic film, which is placed on the light-emitting surface side, is placed so that its prismatic surface faces outside of the light-conducting space. In this case, the direction of the prisms of the first prismatic film should not be parallel with the direction of the light. Thereby, the light-leaking effect and the light-propagation effect are well balanced, and thus the thickness of the light-conducting unit can be easily reduced.

In this embodiment, the three-dimensional arrangement and the shape of the prisms of the second prismatic film are not limited. However, the direction of the prisms of the second prismatic film is preferably not parallel with the direction of the prisms of the first prismatic film, in particular, the angle between the two directions of the prisms is preferably in the range between 40 and 90 degrees. Thus, the light-leaking effect and the light-propagation effect are very easily balanced, even when the light-conducting space has a height of 30 mm or less, in particular, 20 mm or less.

When the angle between the two directions of the prisms is equal to or close to the 0 degree, the apex angle of the prisms of the first prismatic film is preferably in the range between 80 and 95 degrees, while that of the second prismatic film is preferably in the range between 65 to 80 degrees. Thus, the light-leaking effect and the light-propagation effect are very easily balanced, even when the light-conducting space has a height of 30 mm or less.

In the above first embodiment, the angle between the direction of the prisms of the first prismatic film and the direction of the light is not 0 (zero), that is, these two directions are not in parallel with each other. In general, such an angle is in the range between 40 and 90 degrees.

In the second embodiment of the present invention, the prismatic surface of the first prismatic film is placed with facing outside of the light-conducting space and the direction of the prisms of the first prismatic film is in parallel with the direction of the light. In this embodiment, the three-dimensional configuration of the second prismatic film is defined as follows. That is, the direction of the prism of the second prismatic film is not parallel with the direction of said light. Thereby, the light-leaking effect and the light-propagation effect are well balanced, and thus the thickness of the light-conducting unit can be easily reduced. The angle between the direction of the prisms of the second prismatic film and the direction of the light is not 0 (zero), that is, these two directions are not parallel with each other. In general, such an angle is in the range between 40 and 90 degrees.

In the third embodiment of the present invention, the prismatic surface of the first prismatic film is placed with facing outside of the light-conducting space, the direction of the prisms of the first prismatic film is parallel with the direction of the light, and also the direction of the prism of the second prismatic film is parallel with the direction of the light. In this embodiment, the relative configuration of the two prismatic films is defined as follows. That is, as shown in FIG. 3, the two prismatic films are arranged so that the height (the size in the thickness direction) of the light-conducting space decreases from the opening at the first edges of the films towards the farthest edges from the opening. The prismatic surface of the second prismatic film is placed facing outside the light-conducting space. Thereby, the light-leaking effect and the light-propagation effect are well balanced, and thus the thickness of the light-conducting unit can be easily reduced.

In general, the structure, in which the prismatic surface of the first prismatic film is placed facing outside of the light-conducting space, and the directions of the prisms of the two prismatic films are both parallel with the direction of the light, is relatively disadvantageous to increase the light-leaking effect. However, such a disadvantage can be avoided, when the two prismatic films are relatively arranged as described above, and the vertical cross section of the light-conducting space is in the wedge form.

In contrast to the above embodiments, the prismatic surface of the first prismatic film may be placed facing inside of the light-conducting space. In this case, the three-dimensional configuration and the shape of the prisms of the second prismatic film may be defined as follows.

In the fourth embodiment of the present invention, the prismatic surface of the first prismatic film is placed with facing inside of the light-conducting space, while the prismatic surface of the second prismatic film is placed facing outside of the light-conducting space. Thereby, the light-leaking effect and the light-propagation effect are well balanced, and thus the thickness of the light-conducting unit can be easily reduced.

In this embodiment, preferably, the direction of the prisms of the second prismatic film is substantially in parallel with the direction of the light. Thus, the light-leaking effect and the light-propagation effect are very easily balanced, even when the light-conducting space has a height of 30 mm or less.

In this fourth embodiment, preferably, the angle between the direction of the prisms of the first prismatic film and the direction of the light is in the range between 40 and 90 degrees. Thus, the light-leaking effect and the light-propagation effect are very easily balanced, even when the light-conducting space has a height of 20 mm or less.

In the fifth embodiment of the present invention, the prismatic surface of the first prismatic film is placed facing inside of the light-conducting space, and also the prismatic surface of the second prismatic film is placed facing inside of the light-conducting space. In this embodiment, the direction of the prism of the first prismatic film is not perpendicular to the direction of the light. In this case, the angle between the direction of the prisms of the first prismatic film and the direction of the light is preferably in the range between 30 and 60 degrees. Thus, the light-leaking effect and the light-propagation effect are very easily balanced, even when the light-conducting space has a height of 30 mm or less. From such a viewpoint, the angle between the direction of the prisms of the first prismatic film and the direction of the light is more preferably in the range between 40 and 50 degrees.

In this fifth embodiment, preferably, the direction of the prisms of the second prismatic film is substantially parallel with the incident direction of the light. More preferably, the angle between the direction of the prisms of the first prismatic film and the direction of the light is in the range between 30 and 60 degrees, and the direction of the prisms of the second prismatic film is substantially parallel with the direction of the light. Thus, the light-leaking effect and the light-propagation effect are very easily balanced, even when the light-conducting space has a height of 20 mm or less.

In the sixth embodiment of the present invention, the prismatic surface of the first prismatic film is placed facing inside of the light-conducting space, and also the prismatic surface of the second prismatic film is placed facing inside of the light-conducting space, and the direction of the prisms of the first prismatic film is perpendicular to the direction of the light. In this case, the apex angle of the prism of the first prismatic film is smaller than that of the prism of said second prismatic film. Thereby, the light-leaking effect and the light-propagation effect are well balanced.

Also in this embodiment, preferably, the direction of the prisms of the second prismatic film is substantially in parallel with the direction of the light. Thus, the light-leaking effect and the light-propagation effect are very easily balanced, even when the light-conducting space has a height of 30 mm or less.

In this sixth embodiment, the apex angle of the prisms of the first prismatic film is preferably in the range between 65 and 80 degrees, while that of the prisms of the second prismatic film is preferably in the range between 80 and 95 degrees.

In the prismatic film used in the present invention, a plurality of the prisms extend along the lengthwise direction of the prisms, and are parallel with each other. The shape of the apex of each prism may be a polygon, or a rounded form.

To effectively improve the propagation effect, the apex of the prism is preferably a polygon having a specific apex angle. In the case of the polygonal apex, its apex angle is usually from 60 to 100 degrees, preferably from 65 to 95 degrees, more preferably from 70 to 90 degrees.

The prismatic films to be used in the present invention are produced from polymers having a light transmittance of at least 80%, preferably at least 85%, more preferably at least 90%. Herein, the light transmittance is a total light transmittance measured according to JIS K 7105.

The prismatic films may be produced by shaping the polymer using a mold having the specific shape and arrangement corresponding to those of the prisms. The polymers to be used to shape the prismatic films are preferably highly transparent ones having a refractive index of 1.4 to 1.9, such as acrylic polymers, epoxy-modified acrylic polymers, polycarbonate, etc.

The size of the prismatic film is not limited insofar as the effects of the present invention are not impaired. In general, the thickness of the prismatic film (a distance from the flat surface to the apexes of the prisms) is from 50 $\mu$m to 2 mm.

The pitch of the prisms (a distance between the adjacent apexes) is usually from 0.020 to 0.5 mm, preferably from 0.022 to 0.3 mm, and the height of the prism (a height from the bottom between the adjacent prisms and the apex) is usually from 0.01 to 1 mm, preferably from 0.011 to 0.6 mm.

Specific examples of commercially available prismatic films to be used in accordance with the present invention include "BEF® Series", "IDF® Series" and "TRAF®" (all available from 3M, USA).

According to the present invention, the surface light source may be assembled like the above-described conventional surface light sources. That is, the component of the surface light source may be the same as those of the conventional ones except the light-conducting unit.

For example, as a light source, a light source having a conventional shape such as a linear (rod-like) light source, a sphere light source, etc. can be used. For instance, fluorescent tubes, cold cathode-ray tubes, light-emitting diodes, etc. may be used.

An additional light source may be provided near the second opening which is formed at the farthest edges of the prismatic films in addition to the light source provided near the first opening formed at the one edges of the prismatic films. In this case, the height of the light-conducting space does not substantially change from the first opening to the second opening at the edges farthest from the first opening. That is, the flat surfaces of the two prismatic films are substantially parallel to each other.

When the surface light source is assembled, a frame or a case is provided, which surrounds the light-conducting space so that the light does not leak from any part other than the light-emitting surface of the prismatic film. Furthermore, an opaque film such as a reflective film may be provided on the outer surface of the second prismatic film (in relation to the light-conducting space).

As described above, one of the major surface of the first prismatic films, that is, the outer surface in relation to the light-conducting space, is the light-emitting surface.

When the surface and the back surface of the light-conducting unit are reversed, and thus the first prismatic film is treated as the second prismatic film and vice versa, some of the light-conducting units may have the structures included in the above embodiments. In such cases, the outer surface of the second prismatic film may be used as the light-emitting surface.

The area of the light-emitting surface is not limited. In the case of the liquid crystal display, the light-conducting unit of the present invention can be used for a LC display having a small screen of about 2 cm² on one hand and for a LC display having a large screen of about 1 m² on the other hand.

As described above, according to the present invention, the height of the light-conducting space can be decreased, and the thickness of the light-conducting unit and also the surface light source can be reduced. The height of the light-conducting space is usually from 1 to 30 mm, preferably from 2 to 20 mm.

Herein, the height of the light-conducting space is a distance between the facing major surfaces of the two prismatic films measured at the opening formed on the first edges of the films at which the light source is provided. When the prismatic surface of one prismatic film faces the inside of the light-conducting space, the height of the light-conducting space is a distance between the apex of the prism of the one prismatic film to the major surface of the other prismatic film. When both of the prismatic surfaces of the prismatic films face the inside of the inside of the light-conducting space, the height of the light-conducting space is the distance from the apex of the prism of one prismatic film to that of the other prismatic film.

EXAMPLES

The light-conducting units of Examples and Comparative Examples were produced as described below. The structure and sizes of the prismatic film used in each Example were as follows. The plane size of the prismatic film used in each Example was 40 mm×40 mm.

BEF II: Prismatic film (brightness-enhancing film) "BEF® II, 90/50" available from 3M, USA. This film carried a plurality of parallel prisms on its prismatic surface, and the widthwise cross section of each prism was an isosceles triangle having an apex angle of 90 degrees. The distance between the apexes of the adjacent prisms (prism pitch) was 50 μm, and the thickness of the prismatic film (a distance from the flat surface of the film to the apex of the prism) was 155 μm.

TRAF: Prismatic film "TRAF® II" available from 3M, USA. This film carried a plurality of parallel prisms on its prismatic surface, and the widthwise cross section of each prism was an isosceles triangle having an apex angle of 70 degrees. The prism pitch was 31 μm, and the thickness of the prismatic film was 145 μm.

IDF 20: Prismatic film "IDF® 20" available from 3M, USA. This film carried a plurality of parallel prisms on its prismatic surface, and the widthwise cross section of each prism was a triangle having an apex angle of 70.7 degrees, one base angle of 77.6 degrees, and the other base angle of 31.7 degrees. The prism pitch was 50 μm, and the thickness of the prismatic film was 150 μm.

When such a prismatic film having the asymmetric cross section in the widthwise direction of the prism is used with the arranging direction of the prisms being not in parallel with the incident direction of light, either side plane of the prism may face the light source. The side plane to face the light source may be selected so that the light-leaking effect and the light-propagation effect are well balanced.

Among the Examples described below, in Examples 4, 7, 12, 20 and 24, the prismatic film was arranged so that the side planes of the prisms corresponding to the larger base angle (the base angle of 77.6 degrees in the case of IDF 20) faced the light source, while in Examples 3 and 6, the prismatic film was arranged so that the side planes of the prisms corresponding to the smaller base angle (the base angle of 31.7 degrees in the case of IDF 20) faced the light source. The surface light sources of Examples 3 and 16 had the same structure except that only the side plane of the prism of the first prismatic film facing the light source was different.

Examples 1 to 24

A light-conducting unit having the structure of FIG. 3 was assembled as described below. The combination of the types and three-dimensional configurations of the prismatic films in each Example is shown in Table 1. Hereinafter, the production steps of the light-guiding unit is explained by making reference to Example 1.

First, BEF® II (available from 3M) as the first prismatic film was placed on the light-emitting side so that the prismatic surface faced the outside of the light-guiding space (which is indicated by "O" (outside) in Table 1), while BEF® II as the second prismatic film was placed on the back surface side so that the prismatic surface faced the inside of the light-conducting space (which is indicated by "I" (inside) in Table 1). An opening was formed at one edges of the two prismatic films. The height of the light-conducting space measured at this opening was 4 mm. The farthest edges from the opening of the two prismatic films were set as close as possible so that they were almost in contact with each other.

In FIG. 3, the arranging direction of the prisms of the first prismatic film was vertical to the plane of the paper sheet, while that of the prisms of the second prismatic film was parallel with the plane of the paper sheet. That is, the direction of the prisms of the first prismatic film was perpendicular to the incident direction of light from the light source (which is indicated by "H" in Table 1), while that of the prisms of the second prismatic film was parallel with the incident direction of light from the light source (which is indicated by "V" in Table 1).

A light-conducting unit of each of other Examples was assembled in the same way as that in Example 1 except that the combination of the types and three-dimensional configurations of the prismatic films shown in Table 1 was used.

With each light-conducting unit assembled in the Examples, the conditions of the light propagation and leakage were observed as follows:

The light-conducting unit was set in a dark room, and four point light sources (LED) were lined up in parallel with the opening, and lighted. Then, the conditions of the irradiation and propagation of light were observed from the light-emitting surface. In all the Examples, the four bright streams of light emitted from the LEDs continuously run on the light-emitting surface (the major surface of the prismatic film) from the first edges having the light source to the farthest edges from the light source. That is, with the light-conducting units of the present invention, the light-leaking effect and the light-propagation effect can be balanced in the thin light-conducting space, and the desired brightness and the uniformity of light-emission can be achieved in accordance with the brightness of the light source (illumination) and so on.

Comparative Example 1

A light-conducting unit of this comparative example was assembled in the same manner as that in Example 1 except that two transparent acrylic resin films (having no prism on either surface) were used in place of the two prismatic films.

With this light-conducting unit of this Comparative Example, the conditions of the light propagation and leakage were observed in the same manner as that in the Examples. However, an area near the first edge (the light source) was brightly lighted, while an area near the farthest edge was not lighted at all. That is, the light-leaking effect and the light-propagation effect cannot be balanced with the films having no prisms.

Comparative Example 2

A light-conducting unit of this Comparative Example was assembled in the same manner as that in Example 1 except that the three-dimensional configuration of the first prismatic film was such that the prismatic surface faced outside, and the direction of the prisms was parallel with the incident direction of the light (which is indicated by "VO"), while the three-dimensional configuration of the second prismatic film was such that the prismatic surface faced inside, and the direction of the prisms was parallel to the direction of the light (which is indicated by "VI").

With this light-conducting unit of this comparative example, the conditions of the light propagation and leakage were observed in the same manner as that in the Examples. However, an area near the first edge (the light source) was brightly lighted, while an area near the farthest edge was not lighted at all. That is, even if the same prismatic films are used, but the three-dimensional configurations of them are not correct, the light-leaking effect and the light-propagation effect cannot be balanced.

TABLE 1

| Ex. No. | First prismatic film | | Second prismatic film | |
|---|---|---|---|---|
| 1 | BEF II | HO | BEF II | VO |
| 2 | TRAF | HO | BEF II | VO |
| 3 | IDF 20 | HO | BEF II | VO |
| 4 | IDF 20 | HO | BEF II | VO |
| 5 | BEF II | HO | BEF II | VI |
| 6 | TRAF | HO | VEF II | VI |
| 7 | BEF II | HO | IDF 20 | HI |
| 8 | BEF II | HO | BEF II | 45I |
| 9 | BEF II | 45O | BEF II | VI |
| 10 | BEF II | 45O | BEF II | HI |
| 11 | BEF II | VO | BEF II | 45I |
| 12 | BEF II | VO | IDF 20 | HO |
| 13 | BEF II | VO | BEF II | HI |
| 14 | TRAF | VO | BEF II | HI |
| 15 | IDF 20 | VO | BEF II | HI |
| 16 | BEF II | VO | IDF 20 | HI |
| 17 | BEF II | VO | BEF II | VO |
| 18 | BEF II | HI | BEF II | VO |
| 19 | TRAF | HI | BEF II | VO |
| 20 | IDF 20 | HI | BEF II | VO |
| 21 | BEF II | 45I | BEF II | VO |
| 22 | BEF II | 45I | BEF II | VI |
| 23 | TRAF | HI | BEF II | VI |
| 24 | IDF 20 | HI | BEF II | VI |

Notes:
H: The direction of the prisms being perpendicular to the direction of light from the light source.
V: The direction of the prisms being parallel to the incident direction of light from the light source.
45: The direction of the prisms inclining at 45 degrees to the incident direction of light from the light source.
I: The prismatic surface facing the inside of the light-conducting space.
O: The prismatic surface facing the outside of the light-conducting space.

What is claimed is:

1. A light-conducting unit comprising a first prismatic film and a second prismatic film, each having two major surfaces, one of which is a prismatic surface, and the other of which carries no prism, said prismatic surface carrying a plurality of prisms which are arranged substantially parallel to each other along the lengthwise direction of the prisms, wherein said two prismatic films are arranged so that the first edges of said prismatic films are positioned substantially parallel to each other leaving a gap between them to form an opening, a light-conducting space which is in continuous from said opening formed between said prismatic films, and the height of said light-conducting space does not substantially increase from said opening to the remote edges of said prismatic films opposing said opening, and the major surface of said first prismatic film, which faces outside said light-conducting space, is a light-emitting surface to emit light which is propagated from said opening into said light-conducting space, and said prismatic surface of said first prismatic film is placed facing outside of said light-conducting space, and the direction of said prisms of said first prismatic film is not parallel to the direction of said light.

2. A light-conducting unit comprising a first prismatic film and a second prismatic film, each having two major surfaces, one of which is a prismatic surface, and the other of which carries no prism, said prismatic surface carrying a plurality of prisms which are arranged substantially parallel to each other along the lengthwise direction of the prisms, wherein said two prismatic films are arranged so that the first edges of said prismatic films are positioned substantially parallel to each other leaving a gap between them to form an opening, a light-conducting space which is in continuous from said opening formed between said prismatic films, and the height of said light-conducting space does not substantially increase from said opening to the remote edges of said prismatic opposing said opening, and the major surface of said first prismatic film which faces outside said light-conducting space is a light-emitting surface to emit light which is propagated from said opening into said light-conducting space and said prismatic surface of said first prismatic film is placed facing outside of said light-conducting space and the direction of said prisms of said first prismatic film is parallel to the direction of said light, and that the direction of said prism of said second prismatic film is not parallel to the direction of said light.

3. A light-conducting unit comprising a first prismatic film and a second prismatic film, each having two major surfaces, one of which is a prismatic surface, and the other of which carries no prism, said prismatic surface carrying a plurality of prisms which are arranged substantially parallel to each other along the lengthwise direction of the prisms, wherein said two prismatic films are arranged so that the first edges of said prismatic films are arranged substantially parallel to each other leaving a gap between them to form an opening and a light-conducting space which is in continuous from said opening formed between said prismatic films, and the major surface of said first prismatic film, which faces outside said light-conducting space, is a light-emitting surface to emit light which is propagated from said opening into said light-conducting space, and in that said prismatic surface of said first prismatic film is placed facing outside of said light-conducting space, the direction of said prisms of said first prismatic film is parallel to the direction of said light, said prismatic surface of said second prismatic film is placed facing outside of said light-conducting space, and the direction of said prisms of said second prismatic film is parallel to the direction of said light, and that said two prismatic films are arranged so that the height of said light-conducting space decreases from said opening to the remote edges of said prismatic films opposing said opening.

4. A light-conducting unit comprising a first prismatic film and a second prismatic film, each having two major surfaces, one of which is a prismatic surface, and the other of which carries no prism, said prismatic surface carrying a plurality of prisms which are arranged substantially parallel to each other along the lengthwise direction of the prisms, wherein said two prismatic films are arranged so that the first edges of said prismatic films are positioned parallel to each other leaving a gap between them to form an opening, a light-conducting space which is in continuous from said opening formed between said prismatic films, and the height of said light-conducting space does not substantially increase from said opening to the remote edges of said prismatic films opposing said opening, and the major surface of said first prismatic film which faces outside said light-conducting space is a light-emitting surface to emit light which is propagated from said opening into said light-conducting space, and said prismatic surface of said first prismatic film is placed facing inside of said light-conducting space, while said prismatic surface of said second prismatic film is placed facing outside of said light-conducting space.

5. A light-conducting unit comprising a first prismatic film and a second prismatic film, each having two major surfaces, one of which is a prismatic surface, and the other of which carries no prism, said prismatic surface carrying a plurality of prisms which are arranged substantially parallel to each other along the lengthwise direction of the prisms, wherein said two prismatic films are arranged so that the first edges of said prismatic films are positioned substantially parallel to each other leaving a gap between them to form an opening, a light-conducting space which is in continuous from said opening formed between said prismatic films, and the height of said light-conducting space does not substantially increase from said opening to the remote edges of said prismatic films opposing said opening, and the major surface of said first prismatic film, which faces outside said light-conducting space, is a light-emitting surface to emit light which is propagated from said opening into said light-conducting space, and said prismatic surface of said first prismatic film is placed facing inside of said light-conducting space, and also said prismatic surface of said second prismatic film is placed facing inside of said light-conducting space, and that the arranging direction of said prism of said first prismatic film is not perpendicular to the incident direction of said light.

6. A light-conducting unit comprising the first prismatic film and the second prismatic film, each having two major surfaces, one of which is a prismatic surface, and the other of which is a flat surface carrying no prism, said prismatic surface carrying a plurality of prisms which are arranged substantially in parallel with each other along the lengthwise direction of the prisms, wherein said two prismatic films are arranged so that the one edges of said prismatic films are positioned substantially in parallel with each other with leaving a gap between them to form an opening, a light-conducting space, which is in continuous from said opening, is formed between said prismatic films, and the height (the size in the thickness direction) of said light-conducting space does not substantially increase from said opening to the remote edges opposing said opening, and the major surface of said first prismatic film, which faces outside said light-conducting space, is a light-emitting surface to emit light which is propagated from said opening into said light-conducting space, characterized in that said prismatic surface of said first prismatic film is placed with facing inside of said light-conducting space, also said prismatic surface of said second prismatic film is placed with facing inside of said light-conducting space, and the arranging direction of said prisms of said first prismatic film is perpendicular to said incident direction of said light, and that the apex angle of said prism of said first prismatic film is smaller than that of said prism of said second prismatic film.

* * * * *

UNITED STATES PATENT AND TRADEMARK OFFICE
CERTIFICATE OF CORRECTION

PATENT NO. : 6,809,892 B2
DATED : October 26, 2004
INVENTOR(S) : Toyooka, Kazuhiko

It is certified that error appears in the above-identified patent and that said Letters Patent is hereby corrected as shown below:

Column 3,
Line 7, delete "ed" and insert -- reflected --, therefor.
Line 59, after "unit" insert -- . --.

Column 13,
Table 1, line 63, delete "451" and insert -- 45I --, therefore.
Table 1, line 66, delete "451" and insert -- 45I --, therefore.

Signed and Sealed this

Twenty-fourth Day of May, 2005

JON W. DUDAS
*Director of the United States Patent and Trademark Office*